United States Patent [19]

Ryu

[11] Patent Number: 5,351,431
[45] Date of Patent: Oct. 4, 1994

[54] ELECTRONIC FLOAT FOR FISHING TACKLE

[75] Inventor: Seok-Joo Ryu, Chooncheongbook-do, Rep. of Korea

[73] Assignee: Jahwa Sports Co., Ltd., Choongcheongbook-do, Rep. of Korea

[21] Appl. No.: 39,057

[22] PCT Filed: Sep. 27, 1991

[86] PCT No.: PCT/KR91/00020
  § 371 Date: Apr. 5, 1993
  § 102(e) Date: Apr. 5, 1993

[87] PCT Pub. No.: WO92/05692
  PCT Pub. Date: Apr. 16, 1992

[30] Foreign Application Priority Data

Sep. 27, 1990 [KR] Rep. of Korea ............... 1990/15329
Dec. 27, 1990 [KR] Rep. of Korea .......... 1990/21060[U]
Jan. 31, 1991 [KR] Rep. of Korea ............ 1991/1458[U]
Mar. 29, 1991 [KR] Rep. of Korea ............ 1991/4270[U]
Jul. 20, 1991 [KR] Rep. of Korea .......... 1991/11389[U]

[51] Int. Cl.$^5$ ............................................. A01K 93/02
[52] U.S. Cl. ........................................ 43/17; 43/17.5
[58] Field of Search ....................... 43/17.5, 17.6, 17.1, 43/17, 43.1, 44.91

[56] References Cited

U.S. PATENT DOCUMENTS 4,437,255  3/1994  Reed ........................................ 43/17
5,052,145  10/1991  Wang .................................... 43/17.5

FOREIGN PATENT DOCUMENTS

3714124A1  11/1987  Fed. Rep. of Germany .
3727501A1   3/1989  Fed. Rep. of Germany .
2596616    10/1987  France .

OTHER PUBLICATIONS

"Patent Abstracts of Japan" section c vol. 13 No. 399, issued Sep. 5, 1989, The Patent Office Japanese Government, p. 13 C 632 Kokai No. 1-141538.

*Primary Examiner*—P. Austin Bradley
*Assistant Examiner*—Jeanne M. Elpel
*Attorney, Agent, or Firm*—Nixon & Vanderhye

[57] ABSTRACT

An electronic float for fishing tackle in which when a fish bites a bait, a floater (1) moves up and down, causing a magnet (5) inside the hollow of the floater (1) to move, accordingly, up and down nearing or falling apart from a fixed magnet (3) below, thus the equilibrium of the magnet (5) is broken and inertial force is created for the magnet (5) in a vertical direction to keep its up and down motion, thereby to turn the switching means on or off. But, when the floater (1) is stirred by a wind or the waves, inertial force of the magnet (5) is kept negligible, and the magnet (5) hits against the side of wall of the hollow to get its vertical up-down move restrained, and the switching means (4) does not get turned on or off.

8 Claims, 6 Drawing Sheets

ELECTRONIC FLOAT FOR FISHING TACKLE

TECHNICAL FIELD

This invention relates to an electronic float for fishing tackle and, more particularly, to an electronic float, inside which there are a fixed permanent magnet and a moving permanent magnet, this latter movable up and down, fitted in a manner that the same poles of the fixed and moving magnets face each other, whereby this built-in device can generate a signal upon perception of the up-down movement of the float whenever a fish bites.

BACKGROUND OF ART

An electric float device for fishing tackle has been disclosed in Japanese Utility Models Laid-Open Nos. 124593/1978, 122970/1983.

Figure 10:
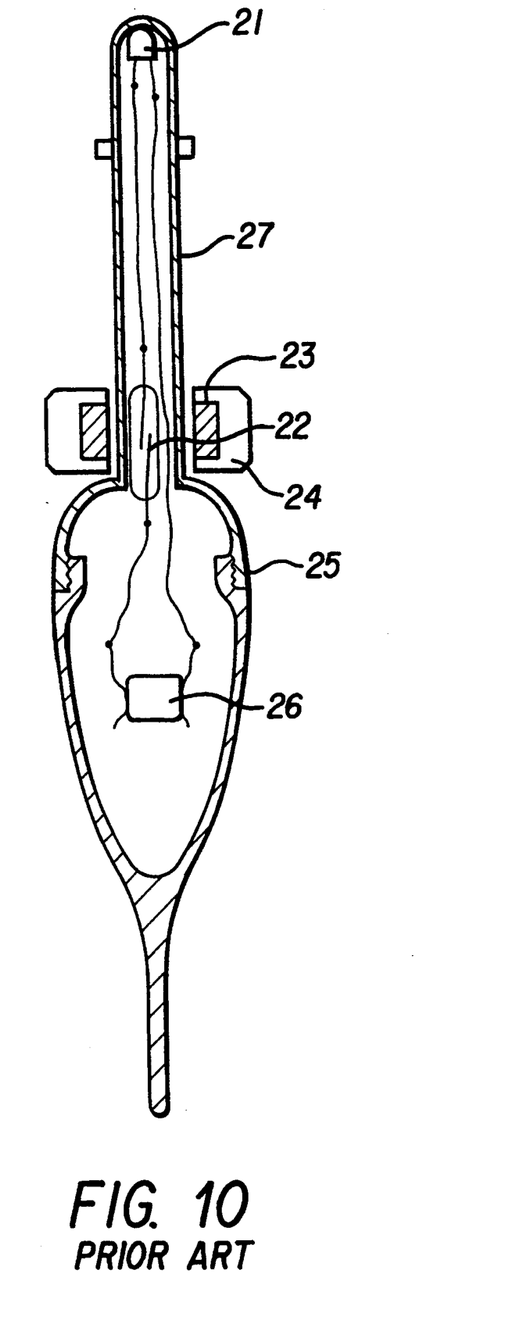
FIG. 10 is a schematic cross-sectional elevational view illustrating a first type of prior art electric float device.

The electric float device disclosed in the above No. 124593/1978 comprises, as shown in FIG. 10, a sensing element 22 which is a lead switch, a cell battery 26, and an illuminant 21 together with a slider member 24, which contains inside the upper frame 27 a switch 22 and outside the upper frame 27 a permanent magnet 23, whereby when a fish bites the slider member 24 moves in contrast with the switch 22 in a manner that when the slider member 24 rises above, by buoyancy, the switch 22 gets turned off and at other times it is kept on.

Accordingly, in the case of this prior art device the switch 22 is turned off when the floater 25 sinks at a bite of a fish, but it does not get turned off when the floater 25 rises as, at this time, the slider member 24 also rises. Moreover, water seeps in between the float 25 and the slider material 24 giving rise to a surface tension to preclude sensitive reaction of the device. As a consequence this conventional electric float has much yet to be desired for accurate perception of a bite of a fish.

Figure 11:
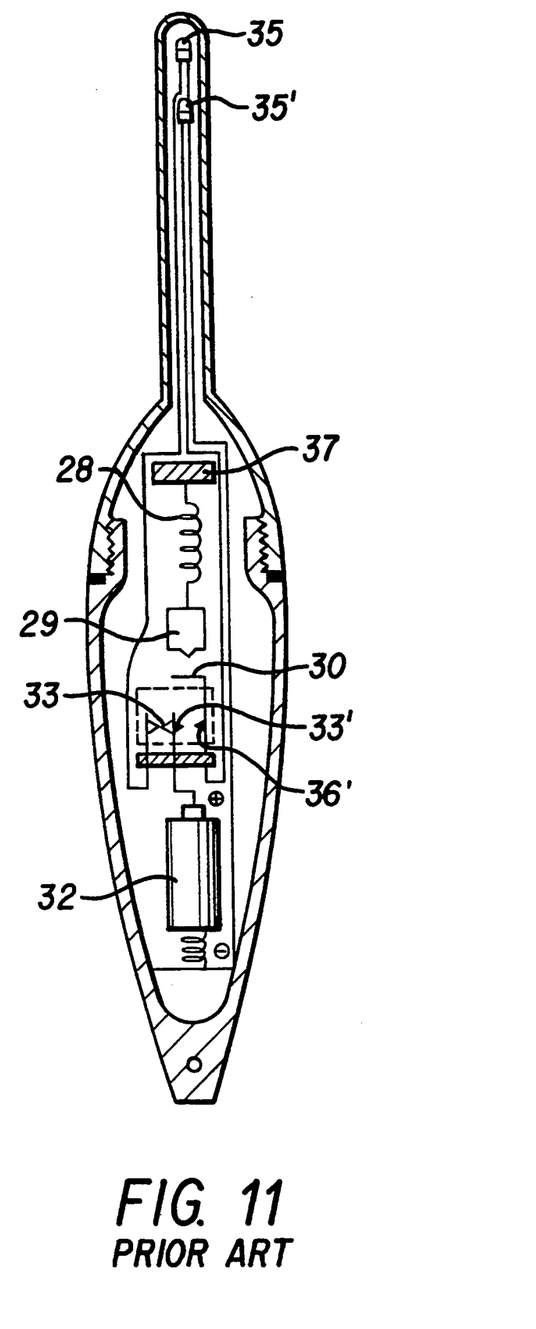
FIG.11 is a schematic cross-sectional elevational view illustrating a second type of prior art electric float device.

The electric float device disclosed in No. 22970/1983 comprises, as is shown in FIG. 11, an electromagnetic circuit of a permanent magnet 29, a spring 28 attached to an anchor 37 and a contact maker 30 of magnetic material, points of electric contact 33', 36', electric illuminants 35, 35', and a cell battery 32, whereby when a fish bites a fish-book, the permanent magnet 29 is placed close to the contact maker 30, and this way switches the illuminants 35, 35' according as the facing points of contact 33' made of magnetic material is sucked into contact with the point of contact 36 built in a body with the contact maker 30.

In this electric float device, if the elasticity of the spring 28 is increased the permanent magnet 29 cannot come down enough to make the points of contact 33', 36' to come into contact at a delicate impact like that of a bite of a fish; while in case the elasticity of the spring 28 is decreased, then, the permanent magnet 29 does not fall apart from the contact maker 30 after having made a contact, preventing a continuous operation. Moreover, in this conventional electric float the permanent magnet 29 often stirs to switch the illuminants 35, 35' even at a slight wind or move of the waves to make it impossible correctly to perceive the bite of a fish.

Therefore, an object of the present invention is to provide an electronic float which operates both when it moves up and when it moves down.

Another object of the present invention is to provide an electronic float which reacts instantly even at a delicate impact like the bites of a fish.

Still another object of the present invention is to provide an electronic float which is not set into erroneous operation at the slit of a wind or the movement of a wave.

A further object of the present invention is to provide an electric float which can perceive and signal the bite of a fish not merely at night but in broad daylight.

DISCLOSURE OF THE INVENTION

To accomplish the above objects, the electronic float of the present invention comprises: a floater which has a vertical hollow inside; a first permanent magnet fixed on the underside; a second permanent magnet on the upside, movable up and down, facing the first permanent magnet below with the same pole; a switching means responding to the approach of the second permanent magnet; and a signal-generating means supplied with power through said switching means, whereby as the float moves up or down the above second permanent magnet also moves up or down by the force of inertia, setting the signal-generating means in operation.

In one of the preferred embodiments of the present invention said second permanent magnet is to move under the guidance of the stick of the float.

In another preferred embodiment said switching means includes a lead switch also, which has a contact point made of magnetic material to come into contact according to a change of magnetic density when said second permanent magnet approaches within a certain distance.

In yet another preferred embodiment, said switching means includes a reflector put on the underside of said second permanent magnet and a light sensing switch fixed on the upper surface of said first permanent magnet below, whereby if said second permanent magnet comes down within a certain distance of the light sensing switch it acts instantly.

In a fourth preferred embodiment the signal-generating means includes two LEDs connected to the switching means, whereby when said second permanent magnet nears within a certain distance of the switching means one LED gets lit and when the second permanent magnet moves out of the certain distance the other LED gets lit.

In a fifth preferred embodiment, the electronic float further comprises a third permanent magnet fixed facing the second permanent magnet with its opposite magnet pole above the second permanent magnet in the floater.

In a sixth preferred embodiment the second permanent magnet is suspended on a coil spring of highly sensitive elasticity.

In a seventh preferred embodiment, then, the aforesaid signal-generating means includes a transmitter connected to the switching means to generate a signal when the second permanent magnet nears within a certain distance of the switching means.

In the present invention, as described above, when a fish prods at or bites the bait the floater moves up and down, the second permanent magnet inside the hollow of the floater moving accordingly up and down nearing or falling apart from the first permanent magnet fixed below. Thus the equilibrium maintained by the interaction (repulsion) of the first and second permanent magnets and the gravity of the second is broken, and a force of inertia is created for the second permanent magnet in the perpendicular direction until it regains its equilibrium to settle in a fixed position. And by this force of inertia the second permanent magnet keeps its up and down motion to or from the first permanent magnet (or the switching means) fixed below, thus turning the switching means on or off. Thus, in turn, the lamp fixed on the upper end of the float lights, or the signal means like the transmitter installed inside the floater comes to be activated.

Accordingly, whenever a fish bites or touches the bait it is perceived, whether the float moves up or down. Only if the float is stirred by a wind or the waves, it moves almost horizontally, and a little tilted at that, with the second permanent magnet's force of inertia kept practically negligible, the second magnet hitting against the guide or the side of the hollow to get its vertical up-down move restrained. Thus the second permanent magnet does not approach, or move away from the switching means, and the switching means does not get turned on or off, its erroneous operation at a wind or the waves thus precluded.

BRIEF DESCRIPTION OF THE DRAWINGS

Further and more complete objects and advantages of the present invention will become readily apparent by reference to the following drawings in which.

BEST MODE FOR CARRYING OUT THE INVENTION

Figure 1:
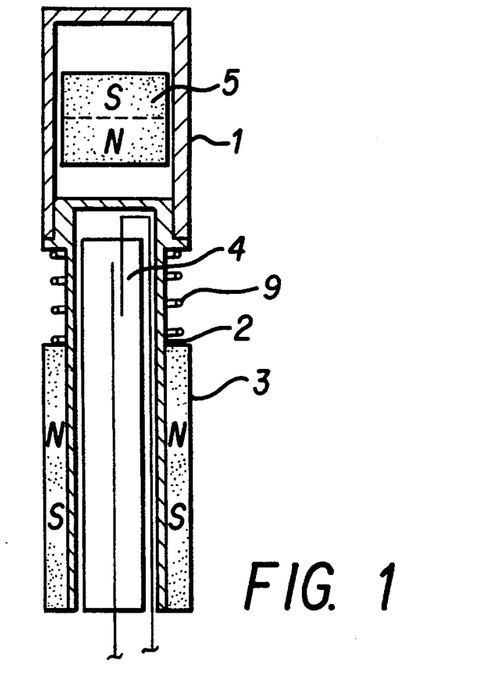
FIG. 1 and FIG. 2 are a diagrammatic view of an electronic float embodying the concepts of the present invention.
Figure 2:
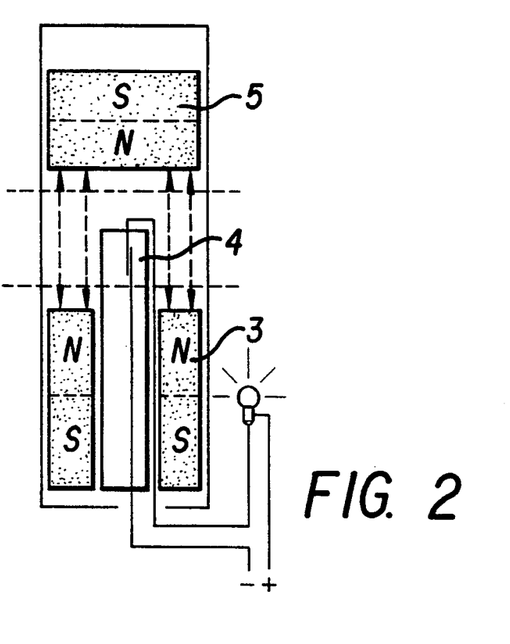

Referring to FIG. 1 and FIG. 2, 1 there is shown a floater 1 with an elongated vertical hollow inside. A cylindrical body 2 is fixed on the underside of the floater 1 which has a lead switch 4 inside. A fixed permanent first permanent magnet 3 is set around the cylindrical body 2. A moving permanent second magnet 5 is fitted in a manner that it, facing the fixed permanent magnet 3 with the same pole, moves freely up and down in the hollow of the floater 1. A spring 9, preferably of highly sensitive elasticity, which is to adjust the distance between the fixed permanent magnet 3 and the lead switch 4.

By this structure the moving permanent magnet 5 can maintain its equilibrium, afloat, by virtue of both the interaction of its own magnetism working in the hollow of the floater 1 and the magnetism of the fixed permanent magnet 3 set around the cylindrical body 2 on the underside of the floater 1 and also the gravity working upon it. This equilibrium, or balance breaks, however, when a fish bites the bait and the float moves up and down. Until the time the moving permanent magnet 5 regains its equilibrium by the magnetism and gravity it keeps moving up and down on its inertial force, and when the moving permanent magnet 5 nears within a certain set distance of the lead switch of the switching means the terminal made of magnetic material comes into contact with the opposite terminal through a change of the magnetic density to supply power to the illuminant lamp (not in the drawing) connected to the lead switch. This state of equilibrium breaks in a relative movement of the moving permanent magnet 5 to the fixed permanent magnet 3, and the lead switch operates when the stick of the tackle moves up, and when it moves down as well.

In contrast, when the float moves at the stir of a wind or the waves, too, the inertial force of the moving permanent 5 acts, but this time in a lateral direction. Then one upper side of the moving permanent magnet 5 and its diagonal side down below touch the side wall in the hollow of the floater 1, the inertial force of the moving permanent magnet 5 in the vertical, up-and-down direction is only negligible, it being unable for the moving permanent magnet 5 to go down within the certain set distance of the lead switch. The lead switch does not get operated in this case, and no erroneous action of the lamp brought forth.

Meanwhile, the moving permanent magnet 5 and the fixed permanent magnet 3 do maintain an equilibrium owing to the mutual repulsion of the magnets. Accordingly, even though one of the terminals of the end switch is made of magnetic material, its magnetic attraction is weak in comparison with the repulsion of the two permanent magnets 3, 5 and the moving permanent magnet 5 is not arrested but can stay aloof from it to maintain its function uninterrupted.

Figure 3:
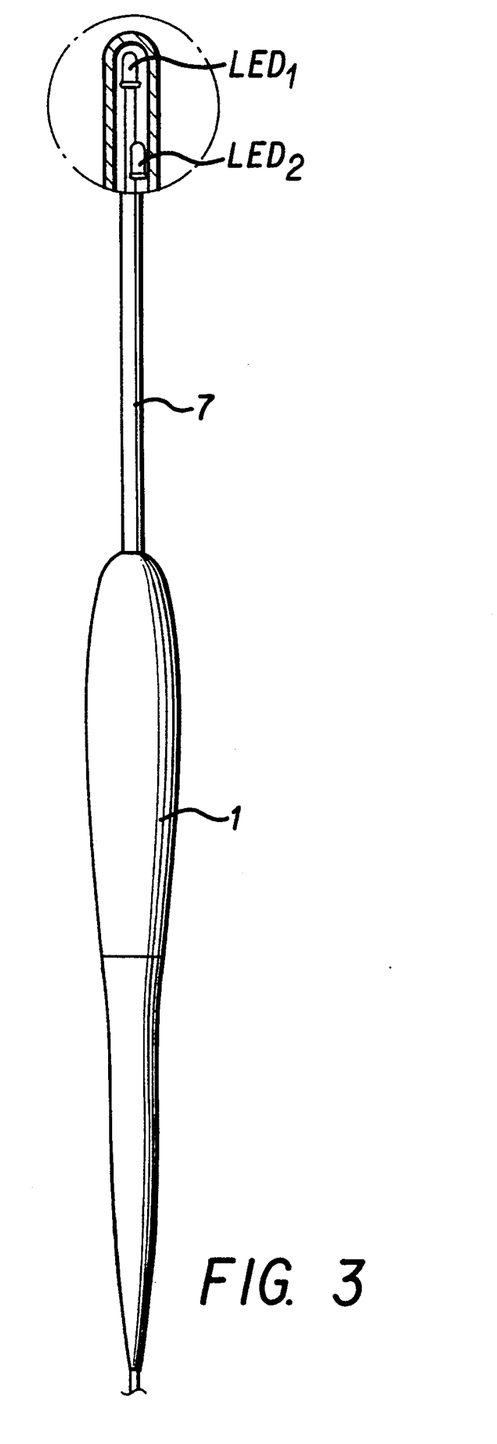
FIG. 3 is an elevational view illustrating a preferred embodiment of the present invention.
Figure 4:
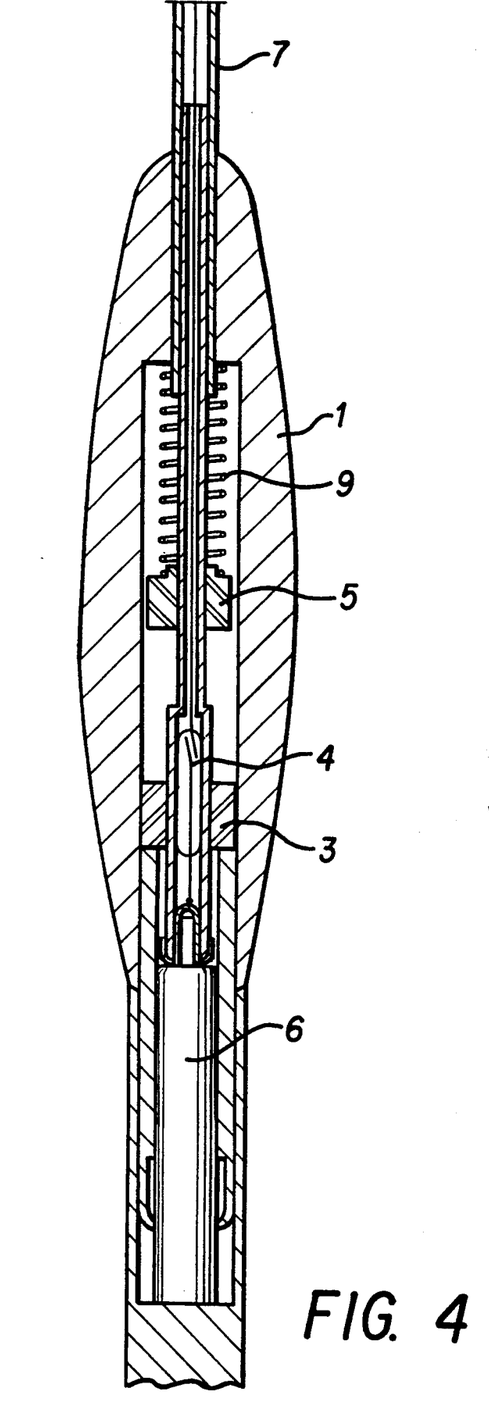
FIG. 4 is a longitudinal sectional view of FIG. 3.

FIG. 3 is an elevational view illustrating a preferred embodiment of the present invention, and FIG. 4 its longitudinal elevation view. In FIGS. 3 and 4 the same numbers as those in FIG. 1 are given to respective corresponding items, detailed explanation for like numbers being omitted.

To the underside end of the stick 7 of the fishing tackle is attached the floater 1 which has a hollow inside, and the moving permanent magnet (the second permanent magnet) 5 is set in the hollow of the floater 1, and on the stick 7 in a manner that the magnet can freely move up and down. Below the second permanent magnet 5 and the lead switch 4 the first, fixed permanent magnet 3 is fixed, to face the second permanent magnet 5 with the same polarity. And the magnetic flux of the poles of both the first permanent magnet 3 and the second permanent magnet 5 together with the distance of the second permanent magnet 5 from the lead switch 4 are adjusted and set in a manner that when the second permanent magnet 5 nears within a certain set distance of the lead switch 4 this lead switch 4 will act by the combined magnetic flux of the first and second permanent magnets 3, 5. The second permanent magnet 5 is suspended from above by coil spring 9.

The coil spring 9 is intended to add its elasticity to the magnetic operation between the first and second permanent magnets 3, 5 and the gravity of the second permanent magnet 5 to help the second permanent magnet 5 keep its equilibrium better, and to add to stroke of the movement of the second permanent magnet 5 up and down so that the lead switch 4 can operate even at the slightest stir by a fish.

Figure 5:
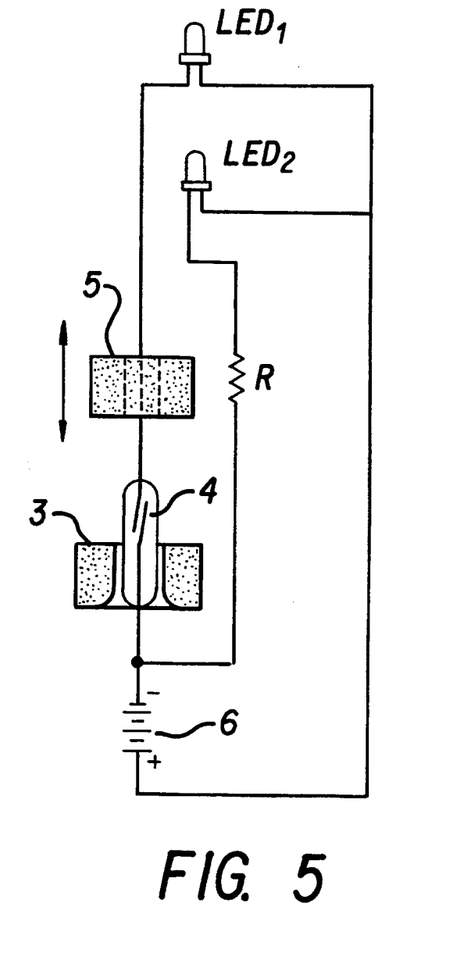
FIG. 5 is a connection view of lamps associated with the electronic float of the present invention.

To the lead switch 4 two lamps LED 1, LED 2, installed on the upper end of the stick 7, are connected, as is illustrated in FIG. 5. Of these two, one LED 1 is illuminated when the lead switch 4 is in contact and the other LED 2 is illuminated when the lead switch 4 is out of contact. The two lamps LED 1, LED 2 are made to shine in different colors from each other. The numeral 6 denotes a battery and R is a resistor.

The basic operation of the embodiments of FIGS. 3 and 4 is the same as has been described in the explanation of FIG. 1 and FIG. 2. And in this structure, though the second, moving permanent magnet 5 is inserted through the stick 7 so that it may freely move up and down, its up and down movement is restrained when the float is moved laterally at the stir by a wind or the waves because, then, not merely is the up-down inertial force of the second permanent magnet 5 negligibly weak but the second permanent magnet 5 stands slantwise to the stick 7, the contact of the second permanent magnet 5 and the stick 7 this way practically nullifying inertial force of the second permanent magnet 5. Thus erroneous operation of the lead switch 4 at the stir by a wind or the waves is prevented.

Then the second permanent magnet 5 is suspended on a coil spring 9, increasing the sensitivity of the permanent second magnet 5 to up-down movement, and thereby the lead switch 4 acts even at the slightest touch or bite of a fish.

Figure 6:
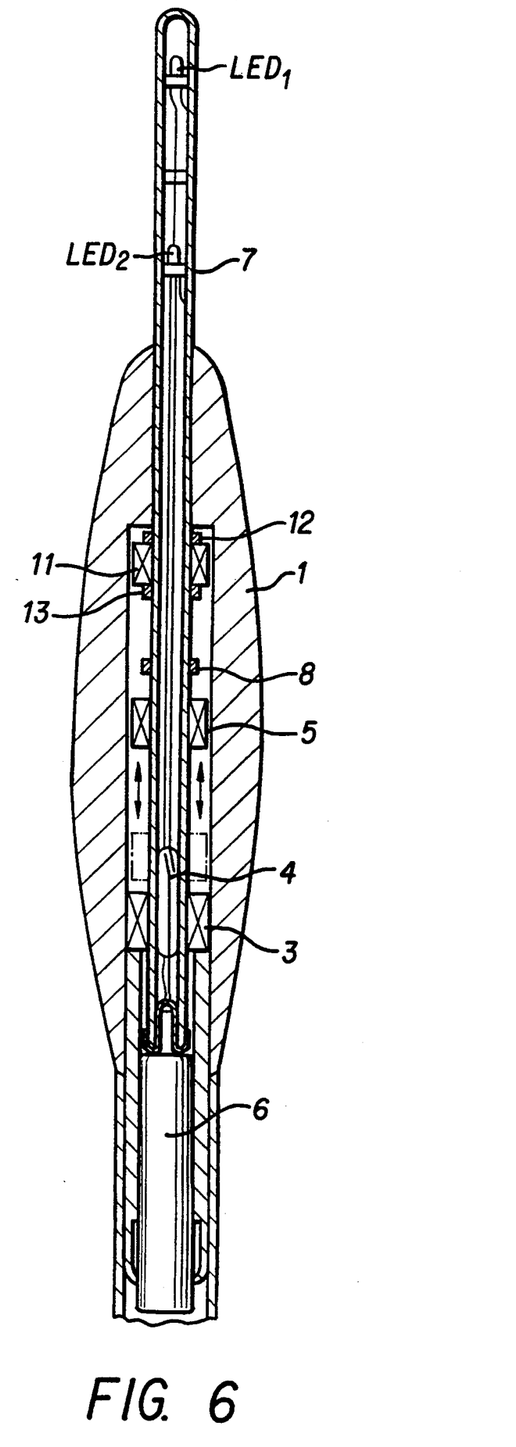
FIG. 6 is a longitudinal sectional view illustrating another preferred embodiment of the present invention.

FIG. 6 illustrates another preferred embodiment of the present invention, but detailed description is omitted for the same numbers given to the same items as have been in FIGS. 3 and 4.

In the electronic float of fishing tackle in FIG. 6, different from what is shown in FIGS. 4 and 5, the coil spring 9 is replaced with a fixed permanent third magnet 11, fixed above the second permanent magnet 5, facing it with the opposite pole and keeping a certain distance from it. Stopper 8 is provided to limit the further upward movement of the second permanent magnet 5, and 12 and 13 are rings for fixing the third permanent magnet 11 respectively.

In the above structure the equilibrium of the second permanent magnet 5 is determined by the interaction of the repulsion between the first permanent magnet 3 and the second permanent magnet 5, the attraction between the second permanent magnet 5 and the third permanent magnet 11, and the gravity of the second permanent magnet 5 by its weight.

Accordingly, at a slightest stir by a fish's bite the inertial force of the second permanent magnet 5 is aggravated in cooperation with the repulsion and attraction of the magnets, and the stroke of the up-down movement of the second permanent magnet 5 is increased, entailing an sensitive reaction of the lead switch 4.

Figure 7:
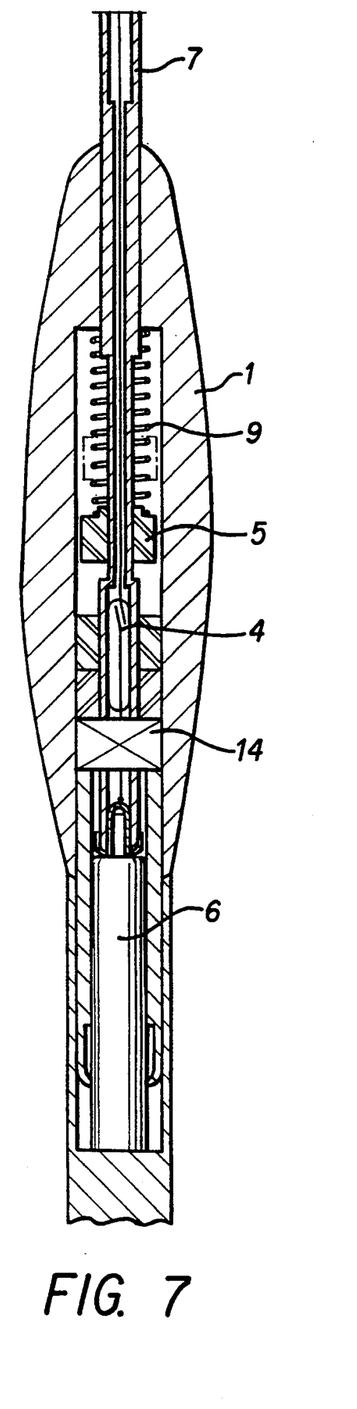
FIG. 7 is a longitudinal sectional view illustrating still another preferred embodiment of the present invention.

FIG. 7 illustrates another preferred embodiment of the present invention.

A lamplight is convenient in the nighttime, but not in the daytime, because it is difficult to discern a light and it is especially so if the float is considerably far off.

FIG. 7 shows an electronic float designed to overcome such inconveniences in the daylight. An ordinary wireless transmitter 14 (See FIG. 9) is set beside the lamp and is connected with the lead switch 4 to transmit a certain signal when the lead switch 4 is activated to be received by a commonly known receiver, FM radio, or other receiving means. The transmitter 14 (see FIG. 9) consists of a low frequency generator 40 for generating low frequency, wherein the low frequency generator 40 consists of capacitors (C1, C2), transistors (TR1, TR2) and resistors (R1, R2, R3), a frequency modulator 41 for modulating the frequency, wherein the low frequency modulator 41 consists of a transistor (TR3), resistors (R4–R7), capacitors (C3–C7) and a tuning coil (L1), and an amplifier 42 for amplifying the signal of the modulated frequency, wherein the amplifier 42 consists of a transistor (TR4), capacitors (C8–C11) and a tuning coil (L2), this high frequency signal being transmitted through the stick 7 or a separate antenna ANT.

Figure 9:
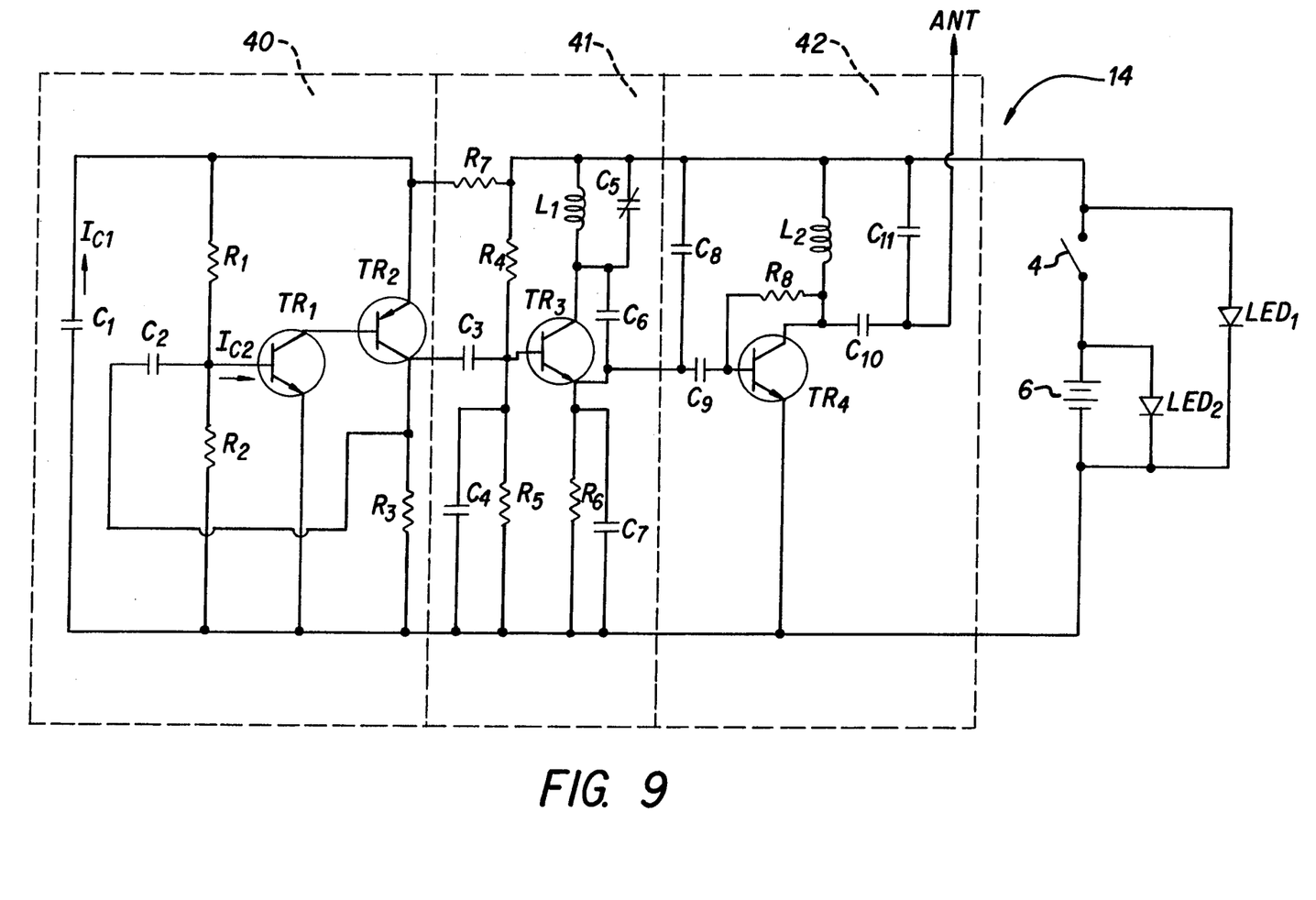
FIG. 9 is an electronic circuit diagram of a transmitter associated with the float of the present invention.

The transmitter 14 is connected to the lead switch 4, as has been said above, and when a fish bites a bait the lead switch 4 instantly sends off a signal, whereby it is easily perceived even in the daytime and far away from the float.

Figure 8:
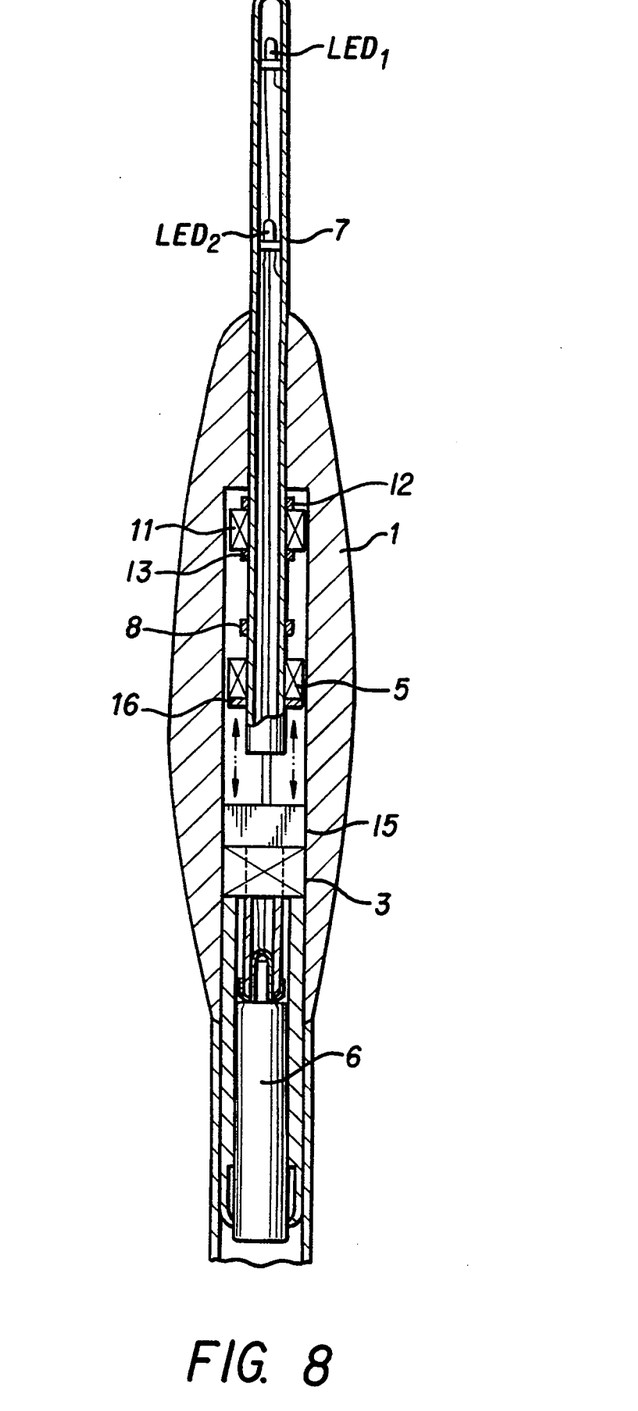
FIG. 8 is a longitudinal sectional view illustrating a further preferred embodiment of the present invention.

FIG. 8 illustrates another of preferred embodiments of the present invention, in which a light sensor switch 15 is made use of, instead of a lead switch 4, in composition of the switching means.

As is shown in FIG. 8 a reflection board 16 is placed on the underside of the second permanent magnet 5 and in the part where the lead switch 4 is placed this light sensor switch 15 is fitted. The light sensor switch 15 generates infrared rays and shoots them upward. When these infrared rays are reflected and shot back by the reflectors 16 the light sensor switch 15 acts upon reception of the reflected infrared rays, the sensitivity of this light sensor switch 15 being adjusted in a manner that exactly when the second permanent magnet 5 approaches within a certain distance of the light sensor switch 15 it instantly acts.

By such a switching means, when the second permanent magnet 5 comes to a certain distance of the light sensor switch 15 this latter 15, getting activated, works either the lamps LED 1, LED 2 or the transmitter 14.

What is claimed is:

1. An electronic float for fishing tackle comprising:
   a stick;
   a floater attached to said stick and having a longitudinal hollow internal cavity;
   a fixed permanent first magnet located in said longitudinal hollow internal cavity of said floater;
   a moving permanent second magnet facing said fixed permanent first magnet with same magnet polarity so as to be movable up and down in said longitudinal hollow inside cavity;
   a switching means which is actuated when said moving permanent second magnet approaches and;
   a signal-generating means supplied with power through said switching means, whereby as said floater moves up or down said moving permanent second magnet also moves up and down by the inertial force of said moving permanent second magnet, actuating said signal-generating means.

2. An electronic float according to claim 1, wherein said stick is extended into said longitudinal hollow internal cavity and said moving permanent second magnet disposed on said stick so as to be movable up and down under the guidance of said stick.

3. An electronic float according to claim 2, wherein said switching means includes a lead switch having a contact point made of magnetic material to come into contact according to the change of magnetic density when said moving permanent second magnet approaches said switching means.

4. An electronic float according to claim 2, wherein said switching means includes a reflector put on said moving permanent second magnet and a light sensing switch on said fixed permanent fixed magnet, wherein said reflector and said fixed permanent first magnet face each other, whereby as said moving permanent second magnet approaches said light sensing switch said light-sensing switch operates.

5. An electronic float according to claim 2, wherein said signal-generating means includes two LEDs connected to said switching means, whereby as said moving permanent second magnet approaches said switching means one of said two LEDs is lit and the other LED of said two LEDs is lit when said moving permanent second magnet does not approach said switching means.

6. An electronic float according to claim 2, wherein the electronic float further comprises a fixed permanent third magnet facing said moving permanent second magnet with opposite magnet polarity.

7. An electronic float according to claim 2, wherein said moving permanent second magnet is suspended on a coil spring.

8. An electronic float according to claim 2, wherein said signal-generating means includes a transmitter connected to said switching means to generate a signal when said moving permanent second magnet approaches said switching means.

* * * * *